United States Patent Office 3,281,950
Patented Nov. 1, 1966

1

3,281,950
FREEZE-DRYING PROCESS
Kurt Kautz, Dahlenburg, near Luneburg, Germany
No Drawing. Filed Oct. 5, 1964, Ser. No. 401,719
14 Claims. (Cl. 34—5)

This invention relates to a process for freeze-drying organic and inorganic materials and more particularly relates to a process for freeze-drying liquid or fluid substances.

Freeze-drying is a well-known process in which a material to be dried is frozen and placed inside an evacuable chamber. Water vapor removal apparatus such as, for example, a refrigerated condenser, then adsorbs sublimating water vapor produced by heating of the frozen material. A predetermined low pressure of for example $10^{-1}$ mm. of mercury is continuously maintained within the evacuable chamber during the drying process by means of conventional vacuum pumps communicating with the evacuable chamber.

One of the important steps in the freeze-drying process is the freezing of the material which is to be dried. The freezing has been accomplished in a variety of ways, including freezing in conventional refrigeration units before placement of the material in the drying installation. Also, freezing of the material is sometimes done directly in the drying chamber itself by, for example, producing a sudden pressure drop within the chamber to cause surface evaporation freezing of the material.

Other freezing methods have been utilized which provide a desirable enlargement of the surface area on the frozen material. The enlarged surface area provides a greater surface from which sublimation can occur, thereby reducing the time required to complete drying of the material. One method of this type involves freezing of liquids in rotating containers wherein the centrifugal forces cause the material to be frozen in relatively thin layers against the inner walls of the containers. Also known is a method in which the liquid material to be frozen is dispensed in a thin layer on a refrigerated surface from which the material is detached by a scraping operation after having been frozen thereon. Still another method introduces liquid material drops onto the surface of a cold liquid medium having a low freezing point such as, for example, methylene chloride, fluorinated hydrocarbon derivatives, petroleum distillates, etc. The frozen pellets formed in this way provide large surface areas for sublimation.

However, none of the above methods has proven entirely satisfactory for freezing certain sensitive materials. With such materials, the above methods of freezing apparently produce some type of structure changes in the material to be dried resulting in an inferior final product. Also, many prior art methods entail high refrigeration costs or produce a frozen material which requires relatively long drying times and are thereby economically impractical for high-volume freeze-drying installations.

The object of this invention, therefore, is to provide a process for freezing materials to be freeze-dried which is rapid and economical in its execution, which does not produce structural damage in the material being frozen and which results in a frozen material which can be completely freeze-dried in relatively short drying times.

One feature of this invention is the provision of a freeze-drying process wherein a fluid substance to be dried is sprayed into a gas-tight chamber containing a cooled gas and wherein the fluid substance is sprayed into the gas-tight chamber in the form of droplets of such size as to be frozen upon contact with the cooled gas before contacting the inner surfaces of the gas-tight chamber.

Another feature of this invention is the provision of a freeze-drying process of the above-featured type wherein a dispersion inducing boost gas is combined with the fluid substance before spraying thereof into the gas-tight chamber.

2

Another feature of this invention is the provision of a freeze-drying process of the above-featured type wherein the boost gas is compressed before being combined with the fluid substance.

Another feature of this invention is the provision of a freeze-drying process of the next-above featured type wherein the mixture formed by the boost gas and the fluid substance is compressed before injection into the gas-tight chamber.

Another feature of this invention is the provision of a freeze-drying process of the above-featured types wherein the cooled gas provides the source of the boost gas which is obtained from the gas-tight chamber through a closed circulation loop including the chamber.

Another feature of this invention is the provision of a freeze-drying process of the above-featured types wherein the cooled gas is an oxygen-free gas and is preferably nitrogen.

Another feature of this invention is the provision of a freeze-drying process of the above-featured types wherein the cooled gas is an oxygen-free gas composed of at least two constituents and preferably including nitrogen and sulphur dioxide.

Another feature of this invention is the provision of a freeze-drying process of the above-featured types wherein the cooled gas is maintained in the gas-tight chamber at substantially above atmospheric pressure, thereby improving the heat transfer between the cooled gas and the injected fluid substance.

These and other objects and features of this invention will become more apparent upon an examination of the following specification.

According to the invention, a liquid or fluid substance to be freeze-dried is introduced into a gas-tight chamber containing a cooled gas. The fluid substance is preferably introduced in the form of a spray composed of small droplets. The nozzle mechanism used to introduce the substance into the gas-tight chamber is adapted to provide substance droplets of a certain maximum size. The maximum size is related to the size of the chamber, the point of substance introduction, and the temperature and pressure of the gas contained so as to effect freezing of the substance droplets by contact with the cooled gas before reaching the inner wall surfaces of the gas-tight chamber.

The freezing process requires an extremely short time, and the frozen particles produced thereby are without any form of structural damage. The frozen particles are easily handled and can be readily filled into the various types of material containers used in conventional freeze-drying installations. Furthermore, the frozen particles offer extremely large sublimation surfaces and a multitude of hollow passages into the interior of the accumulated material. These factors allow rapid drying of the material by conventional freeze-drying methods.

Materials which can be frozen and dried in this manner include various organic and inorganic materials which are liquid or fluid in their natural form or which can be changed into liquid or fluid form by means of suitable solvents. Suitable materials include, for example, fruit juices, milk, pharmaceutical solutions, egg products, etc.

In a preferred embodiment of the invention the quantity of cooled gas contained in the gas-tight chamber is such as to provide a substantially greater than atmospheric pressure. The high pressure increases the molecular contact between the cooled gas and the substance introduced and correspondingly increases the heat transfer therebetween. In this way, the time required to freeze the substance droplets can be reduced.

It is also desirable in many applications to utilize within the gas-tight chamber an oxygen-free cooling gas. In this way, undesirable oxidation of the substance being frozen can be prevented. In this regard, an inert gas such as, for example, nitrogen can be advantageously utilized. An improved result can also be obtained with some organic substances by using a gas such as, for example, sulphur dioxide, which actually provides a preservation effect on the substance being frozen. In other applications, the use as a composite cooling gas formed by a mixture of suitable oxygen-free gases such as, for example, nitrogen and sulphur dioxide is effective.

In a preferred embodiment of the invention a suitable boots gas in combined with the fluid substance before injection of the mixture into the gas-tight chamber by a suitable spray nozzle. The boost gas serves as a dispersing agent for the fluid substance producing substance droplets of the required size. In this way, simple injection noozles may be utilized without a requirement for a mechanical structure, such as impact surfaces or centrifuges, to induce dispersion of the fluid substance.

To further aid in the dispersion of the fluid substance and to also produce desirable cooling of the fluid substance during injection into the gas-tight chamber the boost gas can be compressed before combination with the fluid substance. This desirable effect can also be accomplished by causing compression of the already combined boost gas and fluid substance before introduction of the mixture into the gas-tight chamber. The compression of the boost gas before injection of the mixture into the gas-tight chamber is especially desirable where the substance being processed is an especially viscous material such as, for example, molasses.

A very efficient embodiment of the invention utilizes the cooling gas itself as the boost gas to be combined with the fluid substance. To this end, a closed gas circulation loop which includes the gas-tight chamber can be provided for continuously withdrawing the cooling gas from the chamber, combining it with the fluid substance and injecting the resulting mixture back into the gas-tight chamber. In this operation, the above described compression step can be practiced by providing a compressor in the closed loop either before the combination of the boost gas and fluid substance or after the combination, but in any case before injection of the mixture into the gas-tight chamber.

Obviously many modifications and variations of the present invention are possible in the light of the above teachings. It is therefore understood that within the scope of the appended claims the invention may be practiced otherwise than as specifically described.

What is claimed is:

1. A process for freeze-drying a fluid substance within a gas tight chamber comprising the steps of: introducing a cooling gas into the gas tight chamber, maintaining said cooling gas within the gas tight chamber at a temperature of less than 0° C., combining the fluid substance with a boost gas, spraying into the gas tight chamber the combined boost gas and fluid substance in the form of a fine dispersion composed of droplets of such size as to be frozen upon contact with said cooling gas before contacting the inner surface of the gas tight chamber, and producing sublimation of the frozen moisture contained in the fluid substance so as to cause drying thereof.

2. A process according to claim 1, including the step of compressing said boost gas before combining thereof with the fluid substance.

3. A process according to claim 1, wherein said cooling gas is used as said boost gas and including the step of circulating said boost gas in a closed loop circulation system which includes the gas-tight chamber.

4. A process according to claim 3, including the step of compressing said boost gas in the closed loop circulation system.

5. A process according to claim 1, including the step of compressing the mixture formed by combining said boost gas and the fluid substance before spraying thereof into the gas-tight chamber.

6. A process for freeze-drying within a gas-tight chamber a fluid substance comprising the steps of: introducing a cooling gas into the gas-tight chamber in such quantity as to produce a substantially greater than atmospheric pressure therein, maintaining said cooling gas within the gas-tight chamber at a temperature of less than 0° C., spraying into the gas-tight chamber the fluid substance in the form of a fine dispersion composed of droplets of such size as to be frozen upon contact with said cooling gas before contacting the inner surface of the gas-tight chamber, and producing sublimation of the frozen moisture contained in the fluid substance so as to cause drying thereof.

7. A process according to claim 6, including the step of combining a boost gas with the fluid substance before spraying thereof into the gas-tight chamber.

8. A process according to claim 7, including the step of compressing said boost gas before combining thereof with the fluid substance.

9. A process according to claim 7, wherein said cooling gas is used as said boost gas and including the step of circulating said boost gas in a closed loop circulation system which includes the gas-tight chamber.

10. A process according to claim 9, including the step of compressing said boost gas in the closed loop circulation system.

11. A process according to claim 7 including the step of compressing the mixture formed by combining said boost gas and the fluid substance before spraying thereof into the gas-tight chamber.

12. A process according to claim 6, wherein said cooling gas is an oxygen-free gas and is composed of at least two constituents.

13. A process according to claim 12, wherein said cooling gas introduced into the gas-tight chamber comprises nitrogen and sulphur dioxide.

14. A process for freeze-drying a fluid substance within a gas tight chamber comprising the steps of: introducing an oxygen free cooling gas composed of at least two constituents into the gas tight chamber, maintaining said cooling gas within the gas tight chamber at a temperature of less than 0° C., spraying into the gas tight chamber the fluid substance in the form of a fine dispersion composed of droplets of such size as to be frozen upon contact with said cooling gas before contacting the inner surface of the gas tight chamber, and producing sublimation of the frozen moisture contained in the fluid substance so as to cause drying thereof.

References Cited by the Examiner

UNITED STATES PATENTS

| | | | |
|---|---|---|---|
| 1,976,204 | 10/1934 | Voorhees | 62—74 |
| 2,020,719 | 11/1935 | Bottoms | 62—74 |
| 2,471,035 | 5/1949 | Hurd | 34—92 |
| 2,751,687 | 6/1956 | Colton | 34—5 |
| 3,024,117 | 3/1962 | Barlow | 62—74 |
| 3,052,557 | 9/1962 | Vidal | 62—74 |

WILLIAM J. WYE, *Primary Examiner.*